United States Patent
Cheng et al.

(10) Patent No.: US 10,789,824 B1
(45) Date of Patent: Sep. 29, 2020

(54) PROXIMITY DETECTION IN FABRICATION ENVIRONMENTS HAVING ROBOTS

(71) Applicant: The Boeing Company, Chicago, IL (US)

(72) Inventors: Kevin Cheng, Seattle, WA (US); Farahnaz Sisco, Mukilteo, WA (US); Fei Cai, Edmonds, WA (US)

( * ) Notice: Subject to any disclaimer, the term of this patent is extended or adjusted under 35 U.S.C. 154(b) by 0 days.

(21) Appl. No.: 16/372,306

(22) Filed: Apr. 1, 2019

(51) Int. Cl.
    G08B 13/00 (2006.01)
    G08B 21/02 (2006.01)
    G06F 1/16 (2006.01)
    B25J 9/16 (2006.01)

(52) U.S. Cl.
    CPC ........ *G08B 21/0225* (2013.01); *B25J 9/1676* (2013.01); *G06F 1/163* (2013.01)

(58) Field of Classification Search
    CPC ..... G08B 21/0225; G06F 1/163; B25J 9/1676
    USPC .......................................................... 340/541
    See application file for complete search history.

(56) References Cited

U.S. PATENT DOCUMENTS

| | | | |
|---|---|---|---|
| 7,890,194 B2 | 2/2011 | Pannese | |
| 9,792,746 B2* | 10/2017 | Brunner | F16P 3/08 |
| 2007/0205861 A1* | 9/2007 | Nair | G07C 9/00111 |
| | | | 340/5.61 |
| 2008/0018472 A1* | 1/2008 | Dasilva | G08B 25/016 |
| | | | 340/572.4 |
| 2008/0256131 A1* | 10/2008 | Shimohara | G06Q 10/06 |
| 2009/0072631 A1* | 3/2009 | Iida | B25J 19/06 |
| | | | 307/326 |
| 2014/0130645 A1* | 5/2014 | Takano | B27G 19/02 |
| | | | 83/13 |
| 2016/0202692 A1* | 7/2016 | Patel | G06Q 10/06 |
| | | | 700/109 |
| 2016/0270574 A1 | 9/2016 | Dekar | |
| 2016/0274586 A1* | 9/2016 | Stubbs | G06K 7/10366 |
| 2017/0148116 A1* | 5/2017 | Grossman | G06Q 10/06311 |
| 2017/0151577 A1* | 6/2017 | Baltz | B05B 5/005 |
| 2017/0151668 A1* | 6/2017 | Boesen | B25J 9/1676 |
| 2017/0369288 A1 | 12/2017 | Fulton et al. | |
| 2019/0026930 A1* | 1/2019 | Kritzler | G06F 3/013 |

FOREIGN PATENT DOCUMENTS

| | | |
|---|---|---|
| CA | 2894306 A1 | 1/2016 |
| EP | 1479964 A2 | 11/2014 |
| EP | 3354412 A1 | 8/2018 |

(Continued)

OTHER PUBLICATIONS

Hoyt H286 SVD Personal Safety Voltage Proximity Detector; www.instrumentation2000.com; Mar. 28, 2019.

(Continued)

*Primary Examiner* — Tanmay K Shah
(74) *Attorney, Agent, or Firm* — Duft & Bornsen, PC

(57) ABSTRACT

Systems and methods are provided for reporting proximity in an assembly environment. One method includes equipping a technician with a first proximity detector that is wearable, disposing a second proximity detector at a robot that moves within a cell of the assembly environment, and directing the first proximity detector to provide a warning to the technician if a distance between the first proximity detector and the second proximity detector is less than a threshold.

23 Claims, 9 Drawing Sheets

(56) References Cited

FOREIGN PATENT DOCUMENTS

JP        2016198839 A    12/2016

OTHER PUBLICATIONS

Human-Robot Collaboration in Shared Workspace; http://people.csail.mit.edu.
European Search Report; Application EP20163021; dated Aug. 7, 2020.
European Search Report; Application EP20163027; dated Aug. 13, 2020.
Gil P et al; A Cooperative Robotic System Based on Multiple Sensors to Construct Metallic Structures; Mar. 18, 2009.
European Search Report; Application EP20163025; dated Aug. 12, 2020.
Laoudias, Christos et al; A Survey of Enabling Technologies for Network Localization, Tracking, and Navigation; Ieee Communications Surveys & Tutorials, vol. 20, No. 4, Fourth Quarter 2018.

* cited by examiner

PROXIMITY DETECTION IN FABRICATION ENVIRONMENTS HAVING ROBOTS

FIELD

The disclosure relates to the field of assembly, and in particular, to human-machine interactions in an assembly environment.

BACKGROUND

In an assembly environment, it remains desirable to assemble new parts as quickly and efficiently as possible. It is not uncommon for certain assembly tasks to be performed by automated machines, while other assembly tasks are performed by human technicians. To ensure safety, technicians are restricted from entering zones of operation of the automated machines while the automated machines are operating. This results in "stayout zones" that may reduce the speed and efficiency at which the technicians operate, and or may result in slower assembly rates, which is undesirable. At the same time, it is infeasible to rely on operator awareness of nearby automated machines or otherwise allow automated machines to operate in tandem with technicians in the same zone. Hence, automated machines and technicians are restricted to separate times of use if they both will be utilizing the same zone.

Therefore, it would be desirable to have a method and apparatus that take into account at least some of the issues discussed above, as well as other possible issues.

SUMMARY

Embodiments described herein dynamically determine the proximity of a technician to a robot, and perform a variety of corrective measures based on this proximity. For example, within a first proximity, the technician may receive a warning, and within a second proximity, the robot may be halted. Furthermore, multiple proximity detectors may be disposed at a robot to accurately track the position of multiple components of the robot.

One embodiment is a method for reporting proximity in an assembly environment. The method includes equipping a technician with a first proximity detector that is wearable, disposing a second proximity detector at a robot that moves within a cell of the assembly environment, and directing the first proximity detector to provide a warning to the technician if a distance between the first proximity detector and the second proximity detector is less than a threshold.

A further embodiment is a non-transitory computer readable medium embodying programmed instructions which, when executed by a processor, are operable for performing a method for reporting proximity in an assembly environment. The method includes equipping a technician with a first proximity detector that is wearable, disposing a second proximity detector at a robot that moves within a cell of the assembly environment, and directing the first proximity detector to provide a warning to the technician if a distance between the first proximity detector and the second proximity detector is less than a threshold.

A further embodiment is a system for proximity reporting in an assembly environment. The system includes a first proximity detector that is wearable, a second proximity detector that is disposed at a robot in a cell of the assembly environment, and a proximity server. The proximity server includes a memory storing data indicating a first threshold and a second threshold that is smaller than the first threshold, and a controller that analyzes the first signal and the second signal to determine a distance between the first proximity detector and the second proximity detector, provides a notification to the first proximity detector if the distance is less than the first threshold, and provides a notification to the second proximity detector if the distance is less than the second threshold.

A further embodiment is a system for detecting a proximity between technicians and robots. The system includes sensors that receive signals indicating positions of a first proximity detector worn by a technician and a second proximity detector at a robot. The system also includes a proximity server. The proximity server includes a memory that stores the signals, and a controller that determines a distance between the first proximity detector and the second proximity detector, directs the first proximity detector to provide a warning to the technician if the distance is less than the first threshold, and directs the robot to halt if the distance is less than a second threshold.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
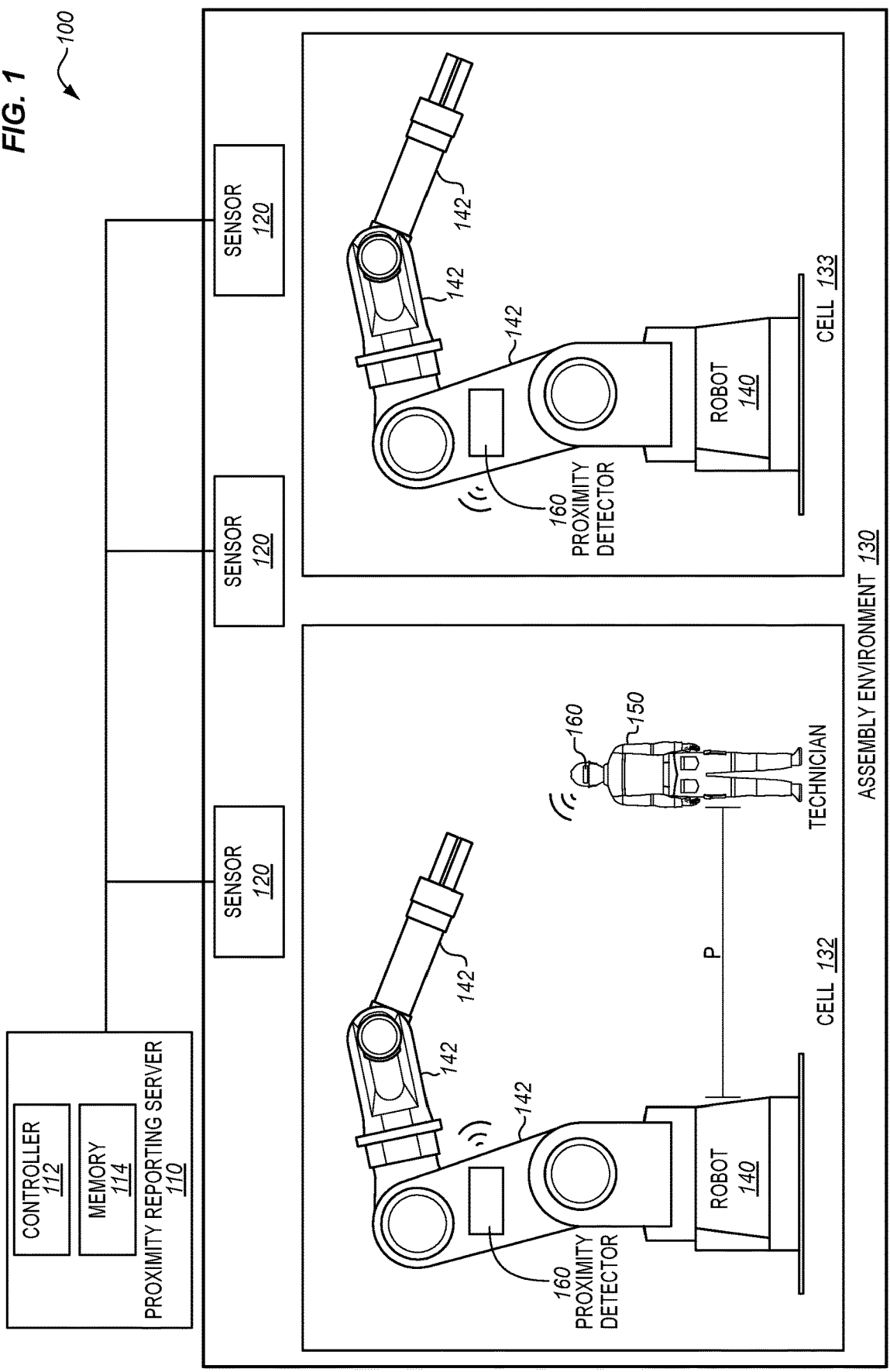
FIG. 1 illustrates a proximity reporting system in an illustrative embodiment.

FIG. 1 is a diagram of proximity reporting system 100 in an illustrative embodiment. Proximity reporting system 100 comprises any system operable to dynamically determine distances between proximity sensors within an assembly environment. Proximity reporting system 100 has been enhanced to distinguish between technicians and robots, and to provide warnings and/or other mitigation based on distances between technicians and robots. This provides a technical benefit by ensuring the safety of technicians who work near robots, while also increasing the up-time of robots within a cell. As used herein, a "cell" comprises any dedicated workspace or volume in which one or more robots/machines are intended to operate.

In this embodiment, proximity reporting system 100 includes proximity reporting server 110, and sensors 120 (e.g., radio antennae, transceivers, cameras, etc.). Sensors 120 receive input from proximity detectors 160, which are disposed within one or more of cells 132-133 of an assembly environment 130 (e.g., a factory floor), and hence sensors 120 operate as an interface of proximity reporting server 110. Proximity detectors 160 are capable of being worn by one or more technicians 150, and also may be disposed at portions 142 (e.g., moving components) of robots 140. Robots 140 may comprise robotic arms, Automated Guided Vehicles (AGVs), flex track machines and other automated devices that move within a cell. As depicted, a technician 150 is wearing a proximity detector 160 within cell 132, and is at a proximity P from a robot 140 within cell 133. Furthermore, as depicted, there is presently no technician or proximity detector within cell 133.

Based on signals from proximity detectors 160, controller 112 of proximity reporting server 110 determines the location of each proximity detector 160. If proximity detectors 160 for one or more technicians are closer than predefined thresholds stored in memory 114 to a proximity detector 160 at a robot 140, then controller 112 may provide a warning. Controller 112 may be implemented, for example, as custom circuitry, as a hardware processor executing programmed instructions, or some combination thereof.

Proximity reporting system 100 enables human-machine collaboration by providing dual safety paths. That is, the robots 140 and technicians 150 are equipped with transceivers to communicate their locations, and these locations may be compared to each other. Based on this comparison, different levels of warning/remediation are provided (e.g., to warn humans and/or shutdown robots) in order to ensure safety when humans and robots work together in the same cell/zone.

Illustrative details of the operation of proximity reporting system 100 will be discussed with regard to the flowchart of FIG. 2. Assume, for this embodiment, that a technician 150 of FIG. 1 is planning on entering a cell 132 where robots 140 are presently operating. For example, the robots may be assembling/joining composite parts and/or metal parts for use in an aircraft.

Figure 2:
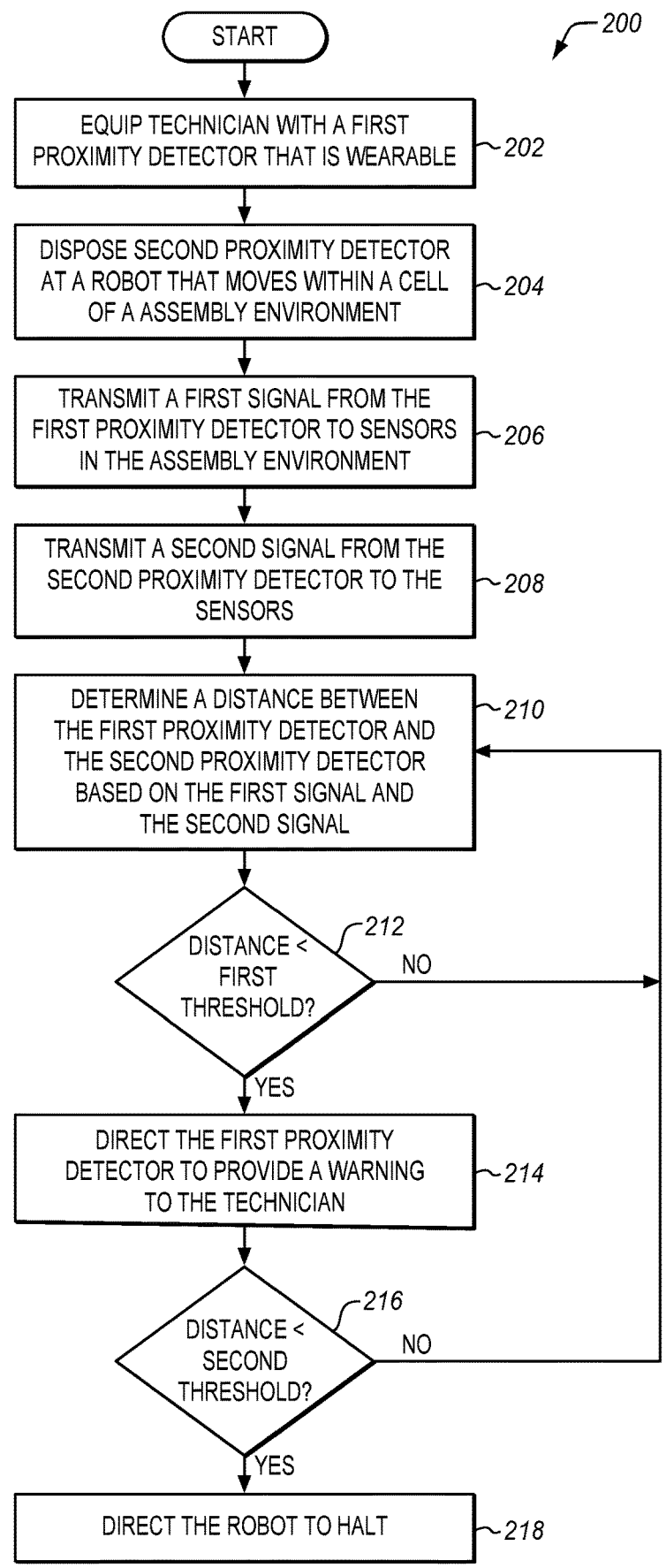
FIG. 2 is a flowchart illustrating a method for reporting proximity in an illustrative embodiment.

FIG. 2 is a flowchart illustrating a method 200 for reporting proximity in an illustrative embodiment. The steps of method 200 are described with reference to proximity reporting system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, a technician 150 is equipped with a first proximity detector (e.g., one or more of proximity detectors 160). The first proximity detector is wearable in that it may be carried on the technician in a hands-free manner. For example, the proximity detector may be added to headwear (e.g., a helmet) of the technician, may be equipped by hook-and-loop fastener (e.g., Velcro) fabric to clothing worn by the technician 150, may be placed in a pocket of the technician, may be in the form of a pendant or smart wrist watch worn by the technician 150, may be sewn or bonded to clothing worn by the technician 150, may be implemented as smart safety glasses that provide visual, audio or vibratory warnings or any combination thereof, or may be equipped via other means.

In step 204, a second proximity detector is disposed at a portion 142 of a robot 140 that moves within assembly environment 130. This may comprise placing multiple proximity detectors 160 at (e.g., disposed on or within) each robot 140 within the cell, and may be performed during initial setup and calibration of the robots 140 before maintenance or inspection is desired. In some embodiments, the second proximity detector is coupled with the power supply of the robot 140, and communicates with a controller of the robot 140. With the first proximity detector and second proximity detector in place, the technician 150 proceeds into the cell 132 (e.g., to perform inspections, assist with assembly or maintenance). During this time, robots 140 within the cell 132 may continue to operate.

In step 206, the first proximity detector transmits a first signal to sensors 120 in the assembly environment 130 (e.g., sensors 120 disposed outside of the cell 132, inside of the cell 132, at the robot 140, etc.). In one embodiment, the first signal comprises an UltraWide Band (UWB) radio signal that provides a unique identifier for the first proximity detector that distinguishes it from other proximity detectors 160 in assembly environment 130. The first proximity detector may be associated with a specific technician indicated in memory 114 of proximity reporting server 110. In a further embodiment, the first signal also explicitly recites the technician or robot to which the first proximity detector is attached. In still further embodiments, the first signal is transmitted over multiple different radio bands or channels of communication. The first signal may even be transmitted via a Light Emitting Diode (LED) as a visual code in certain embodiments. Transmitting the first signal via multiple distinct channels of communication provides a technical benefit of ensuring that the signal can be received and processed by sensors 120. The first signal may be transmitted continuously or periodically (e.g., once or multiple times per second).

In step 208, the second proximity detector transmits a second signal to the sensors 120. The second signal uniquely identifies the second proximity detector, and may be transmitted via the same channels and in a similar manner to the first signal. The first signal and the second signal are received at sensors 120, and the signals are provided to proximity reporting server 110 for analysis.

In step 210, controller 112 of proximity reporting server 110 determines a distance between the first proximity detector and the second proximity detector based on the first signal and the second signal. This may be performed by consulting information stored in memory 114 indicating a position of each sensor, triangulating a first position of the first proximity detector and a second position of the second proximity detector based on the strength of signals received at each sensor 120, and determining an amount of separation between the first position and the second position. Memory 114 may store signals from the sensors 120 as a part of this process. In further embodiments wherein the sensors 120 comprise cameras, the angle of each camera, and stereoscopic equipment or techniques may be used in order to determine position. In further embodiments, controller 112 may select which proximity detectors to determine distances between. For example, controller 112 may selectively forego distance determinations between proximity detectors located on technicians, proximity detectors located on the same entity (e.g., the same technician, the same robot, etc.), proximity detectors located on robots (e.g., in circumstances where existing collision avoidance technologies for the robots already prevent collisions), etc. This may increase the rate at which controller 112 may perform distance determinations which are most relevant (i.e., most likely to enhance safety). In still further embodiments, motion detection techniques may be used on distance data acquired over time to determine the current speed and/or direction of a technician or robot.

After the distance has been determined, in step 212 controller 112 determines whether the distance is less than the first threshold. The distance thresholds described herein may be statically defined on a per-robot basis, or may be dynamically determined based on movements indicated in an NC program for the robot, and/or a position of the robot within the NC program as the robot continues to operate. For example, if a path of a robot in the future is expected to cause the robot to reduce its distance to a technician, the threshold may be increased to ensure that a warning is issued more quickly.

If the distance is not less than the first threshold, then the technician 150 is far away from the robot 140. Therefore, the robot 140 may continue operations. Processing therefore continues to step 210. Alternatively, if the distance is less than the first threshold in step 212, then in step 214, controller 112 directs the first proximity detector (e.g., via sensors 120) to provide a warning to the technician 150. The operating environment within the cell 132 may include visual, auditory, and/or other stimuli that may dull the senses of the technician 150. Therefore, the warning may be generated to stimulate multiple senses (e.g., via bright light, vibratory motion, and or distinctive sounds). The warning may even take the form of a verbal warning stating "halt movement forward," "do not move to the left," "do not move south," or similar phrases, depending on the location of the technician relative to the robot. The warning is a cue for the technician 150 that encourages increased awareness and caution. In further embodiments, the warning may be implemented in the form of a flashing light on the helmet, glasses, or gloves of the technician, or as a flashing light or siren at the robot.

In step 216, controller 112 also determines whether the distance between the first proximity detector and the second proximity detector is less than a second threshold. If the distance is less than the second threshold, then in step 218 controller 112 directs the robot 140 to halt. This provides a technical benefit by ensuring that the technician remains safe, even when they move close to an actively operating robot. This also provides a technical benefit because it does not require each robot to include its own dedicated technician avoidance sensors and logic.

Method 200 may be performed for multiple sets of proximity detectors substantially concurrently and asynchronously. For example, method 200 may be performed multiple times to determine additional distances between a proximity detector at a technician and proximity detectors at additional robots. This enables proximity detection to be performed for all relevant entities within a manufacturing cell, or even across an entire factory floor.

Figure 3:
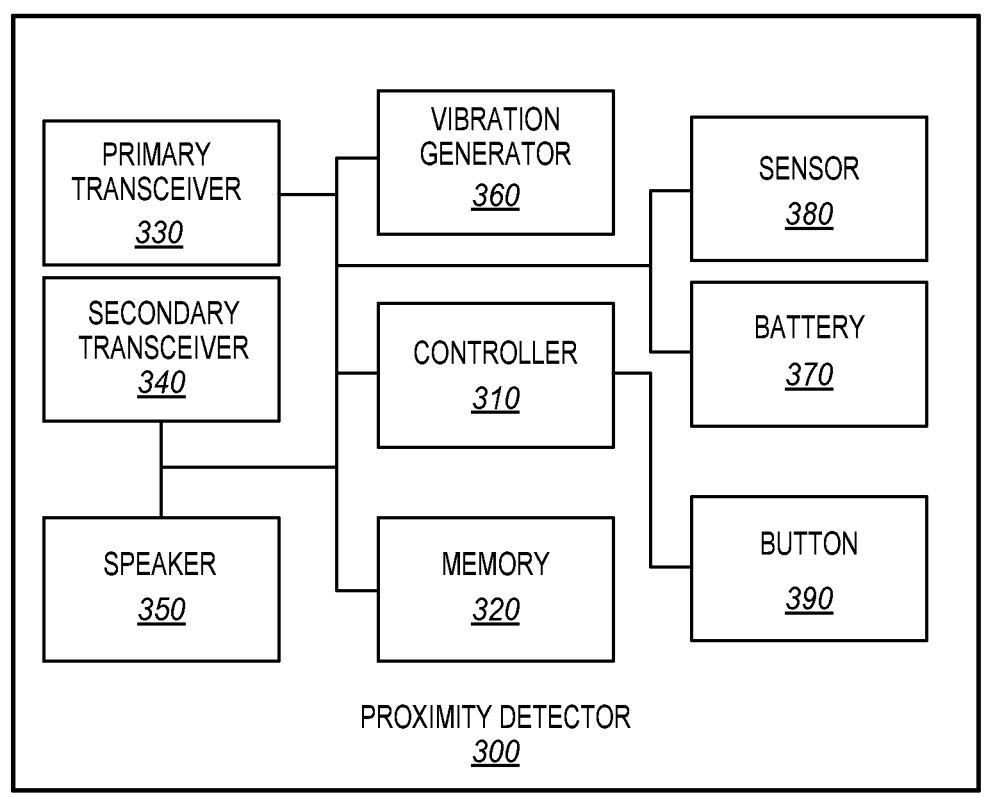
FIG. 3 is a diagram of a proximity detector in an illustrative embodiment.

FIG. 3 is a diagram of a proximity detector 300 in an illustrative embodiment. Proximity detector 300 includes a controller 310, memory 320, and a primary transceiver 330 as well as a secondary transceiver 340. Primary transceiver 330 and secondary transceiver 340 operate using different frequency ranges (or modalities of communication, such as optical vs. radio) in order to transmit a signal from proximity detector 300. Thus, if one frequency range experiences interference or noise, the other transceiver may still provide the signal at another frequency range. Proximity detector 300 also includes vibration generator 360 (e.g., a piezoelectric element, a vibrational motor, etc.), and speaker 350. When generating a warning, controller 310 may activate one or both of these elements to draw the attention of a technician. In further embodiments, proximity detector 300 may generate an alert at eyewear worn by the technician 150 to cause flashing lights, other visual input, or vibrations that provide a warning. For example, an audio warning may be generated by portions of eyewear located proximate to the temples of a technician and in particular the ends of the temples. In further embodiments, the eyewear comprises smart safety glasses with visual, audio or vibratory warnings or any combination thereof. In some embodiments, Bluetooth technology is utilized, wherein the technician wears a base station in communication with wearable devices such as hats, helmets, gloves, glasses, vests, etc. that implement proximity detectors. In this embodiment, proximity detector 300 also includes battery 370 and sensor 380. Sensor 380 detects a battery level (e.g., by measuring voltage at battery 370). Sensor 380 may report this battery level to controller 310. If the battery level is below a desired value, then controller 310 may generate a battery level warning via speaker 350 and/or vibration generator 360. Proximity detector 300 may further include a button 390. Pressing button 390 may operate the first proximity detector to issue a command to remotely halt robots 140 that are within the same cell as the technician 150.

In further embodiments, battery level information may be reported to proximity reporting server 110. Each cell may be associated with a predetermined battery level. This may be the battery level desired in order to ensure that proximity detector 300 continues to operate while a technician performs inspections or maintenance within that cell. Upon entry to the cell (e.g., as determined based on a triangulated location of the proximity detector 300), controller 112 may compare the current battery level to that desired for the cell. Controller 112 may further direct the proximity detector 300 to generate a warning if the battery level is below the predetermined battery level when the technician attempts to enter the cell. Proximity reporting server 110 may further estimate a period of time during which a technician is expected to remain in the cell 132 that they currently occupy, and instruct proximity detector 300 to generate a battery level warning if the battery level drops below a battery level expected at this point in time during the inspection or maintenance process.

In still further embodiments, proximity reporting server 110 may determine that a proximity detector has not transmitted a signal for longer than a predefined duration (e.g., one second, ten seconds, thirty seconds, one minute, etc.). In response to this determination, proximity reporting server 110 may transmit a halt instruction to all robots located in the cell that the proximity detector was last detected in. This ensures safety in the event of an unexpected power loss to a proximity detector, and enables the technician to safely exit the cell even in the event of total battery loss or device failure.

Additional proximity detectors, such as those disposed at a robot 140, may be equipped without vibration generators, batteries, battery sensors, and/or speakers. Such proximity sensors may be directly attached to a power source of the robot that they are attached to, and may have controllers which directly communicate with a controller of the robot 140 to which they are mounted.

Figure 4:
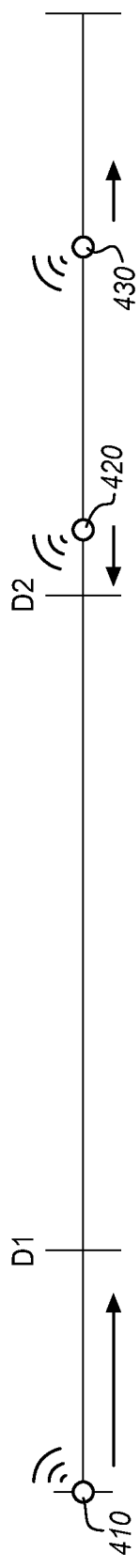
FIGS. 4-6 depict distances between proximity detectors in an illustrative embodiment.
Figure 5:
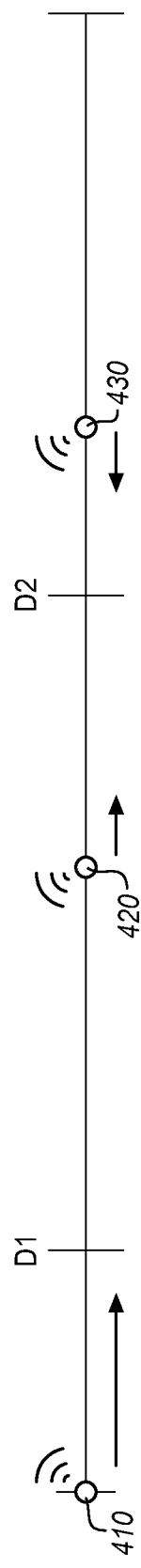
Figure 6:
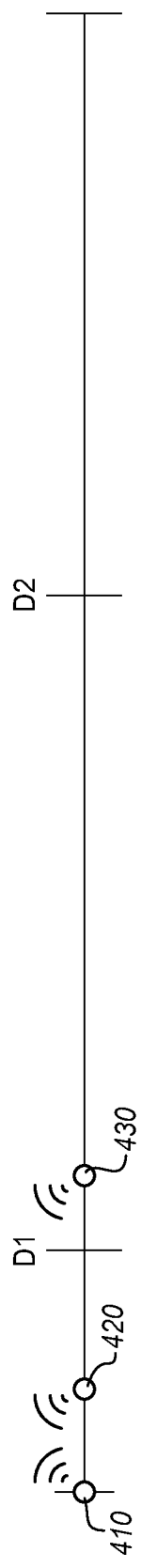

FIGS. 4-6 depict distances between proximity detectors in an illustrative embodiment. Assume, for this embodiment, that proximity detector 410 is located at a technician who is moving within a cell. The technician is moving towards a proximity detector 420 disposed at a first robot, and a proximity detector 430 disposed at a second robot as shown in FIG. 4. The robots to which proximity detectors 420 and 430 are attached are also moving, and in different directions. As the technician and the robots move, the distance between proximity detector 410 and proximity detectors 420 and 430 decreases, until proximity detector 420 is within a distance D2, as shown in FIG. 5. This causes the proximity detector 410 to emit a warning. In FIG. 6, the technician and robots have continued to move, bringing proximity detector 420 within a distance D1, and bringing proximity detector 430 within a distance D2. The warning continues to emanate from proximity detector 410, and the robot to which proximity detector 420 is attached, is halted. Halting the robot may comprise preventing the robot from moving, deactivating the robot, causing the robot to move into a "safety" pose or other retracted state, or having the robot actively move away from the technician.

Figure 7:
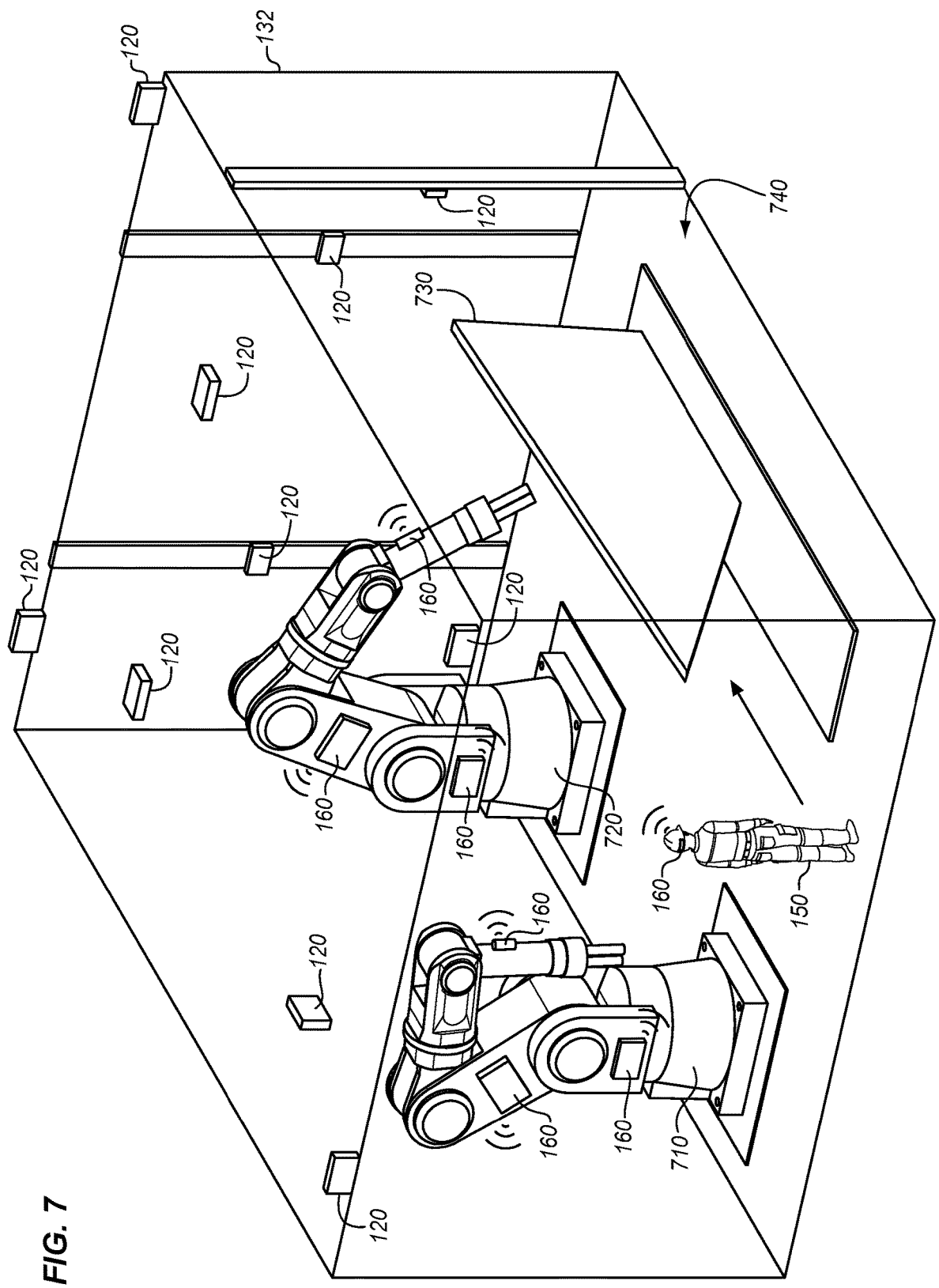
FIGS. 7-8 depict a technician proceeding across a cell of a factory floor in an illustrative embodiment.
Figure 8:
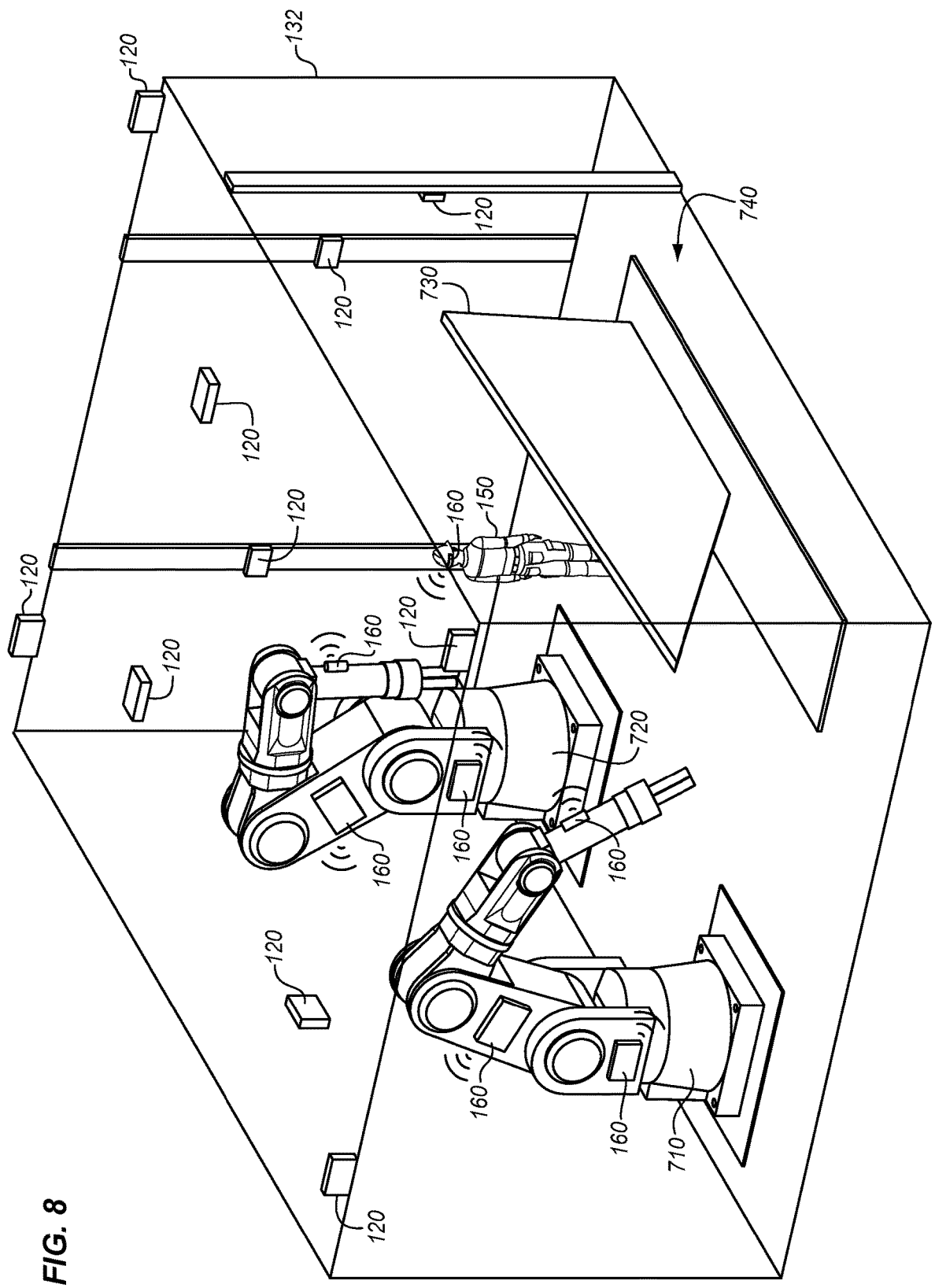

FIGS. 7-8 depict a technician proceeding across a cell 132 of a factory floor in an illustrative embodiment. In this embodiment, robot 710 and robot 720 each include proximity detectors 160 disposed at different portions of the robot (e.g., at an end effector of the robot, at a base of the robot, etc.) which may move to different locations. For example, the proximity detectors 160 attached to the robots may each be placed on a different rigid body within a kinematic chain of the robot. As the technician 150 proceeds through volume 740 of cell 132 the robots turn off and then back on. For example, as shown in FIG. 7, robot 710 deactivates and halts work on part 730 while the technician proceeds within the cell 132, and then as shown in FIG. 8, robot 710 may reactivate to perform work on part 730, while robot 720 deactivates. That is, because technician 150 has moved close to robot 720 in FIG. 8, robot 720 has been shut down (e.g., by halting all motion, or returning to a home/retracted position. However, because technician 150 has moved further away from robot 710, robot 710 is reactivated.

Figure 9:
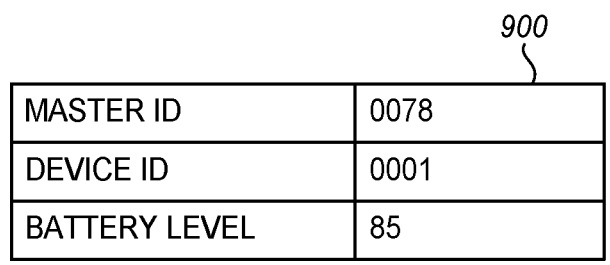
FIGS. 9-10 illustrate communications transmitted between proximity detectors and a proximity reporting server in an illustrative embodiment.
Figure 10:
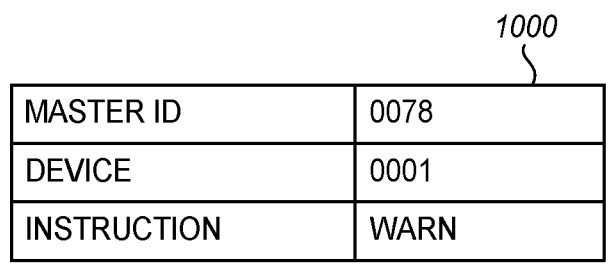

FIGS. 9-10 illustrate communications transmitted between proximity detectors and a proximity reporting server in an illustrative embodiment. FIG. 9 illustrates a communication 900 for a signal transmitted by a proximity detector. The communication may be packetized according to a well-known wireless protocol (e.g., in accordance with an IEEE 802.11 protocol, in accordance with Bluetooth, etc.) and received via sensors 120, or may otherwise be modulated to carry information. According to FIG. 9, communication 900 includes a master ID indicating the robot or person to which it is attached. Communication 900 also includes a device ID that uniquely distinguishes the proximity detector from other proximity detectors at the same person or robot. Communication 900 further reports a battery level for the proximity detector that generated the communication. FIG. 10 depicts a communication 1000 that may be provided to a proximity detector by proximity reporting server 110. In this embodiment, communication 1000 comprises a notification. Communication 1000 includes an identifier for the device it is directed to, an identifier for the proximity detector that it is directed to, and an instruction provided to the proximity detector. Example instructions may include a warning, an instruction to halt operations, an instruction to resume operations, and others. For example, a first notification (e.g., a notification to warn) may be provided to a proximity detector worn by a technician if a distance of a proximity detector at a robot is less than a first threshold, while a second notification (e.g., a notification to halt) may be provided to the second proximity detector of the distance is less than a second threshold which is smaller than the first threshold.

EXAMPLES

In the following examples, additional processes, systems, and methods are described in the context of proximity reporting system.

Figure 11:
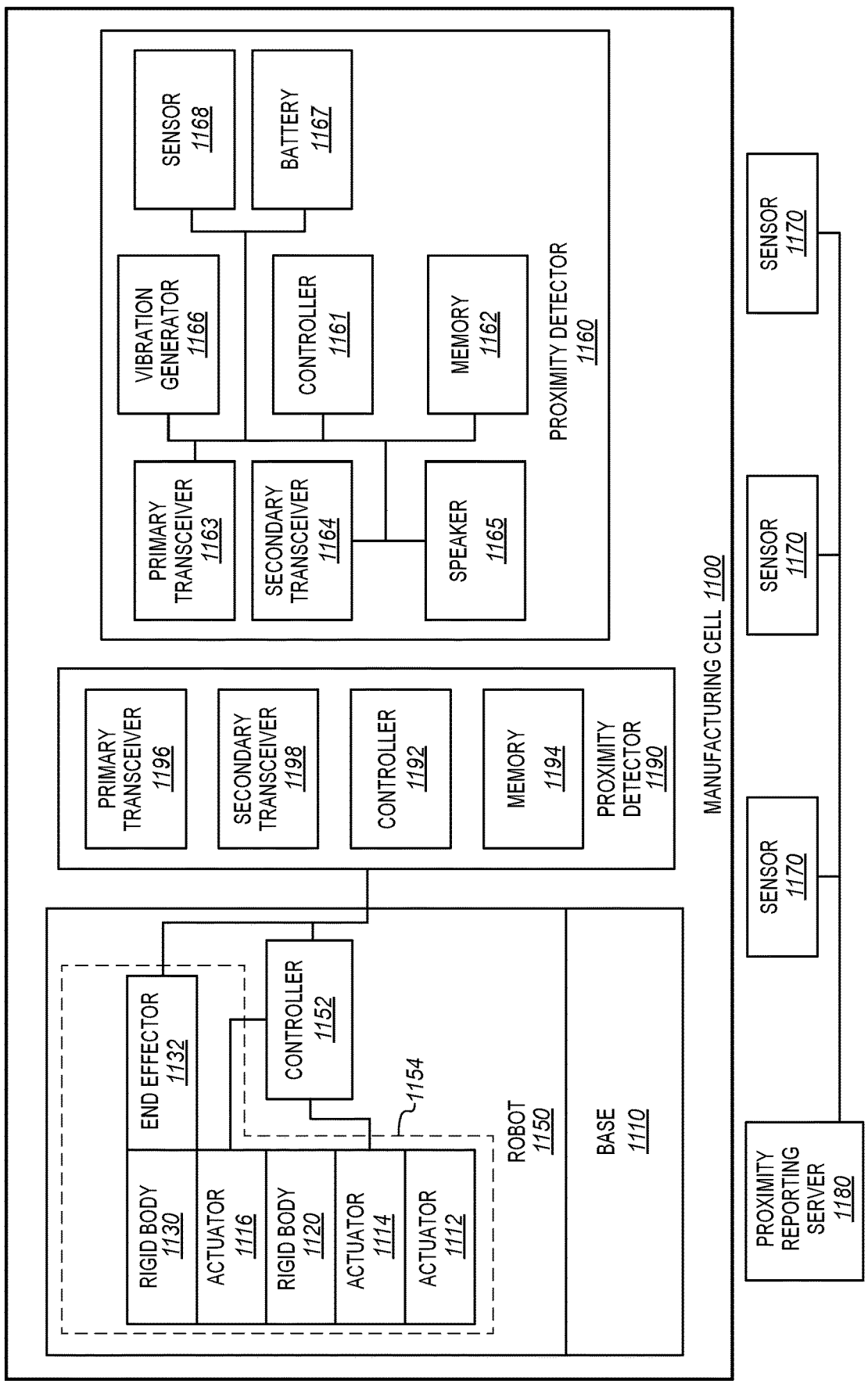
FIG. 11 is a block diagram of a proximity reporting system in an illustrative embodiment.

FIG. 11 is a block diagram of a proximity reporting system in an illustrative embodiment. As shown in FIG. 11, manufacturing cell 1100 includes robot 1150. Robot 1150 is attached to base 1110, and includes controller 1152. Controller 1152 directs the operations of actuators 1112, 1114, and 1116, in order to reposition rigid bodies 1120 and 1130 (e.g., in accordance with a Numerical Control (NC) program). This also repositions end effector 1132. The combination of actuators 1112, 1114, and 1116, and rigid bodies 1120 and 1130 (including end effector 1132) form kinematic chain 1154.

Proximity detector 1190 is mounted to robot 1150, and is coupled for communication with controller 1152. Proximity detector 1190 includes controller 1192, which generates signals for processing by proximity reporting server 1180, and further includes memory 1194. Signals are transmitted via primary transceiver 1196 and/or secondary transceiver 1198 in order to provide redundancy and reduce the potential for the signal to be interfered with. Signals transmitted from proximity detector 1190 are received at sensors 1170.

Proximity detector 1160 is worn by a technician within manufacturing cell 1100. Proximity detector 1160 includes controller 1161, which generates signals, memory 1162, which stores instructions for generating and interpreting signals. Proximity detector 1160 further includes primary transceiver 1163 and secondary transceiver 1164. Speaker 1165 and vibration generator 1166 are used to generate warnings for the technician, and battery 1167 provides mobile power. Sensor 1168 reports battery levels to controller 1161 for interpretation.

Figure 12:
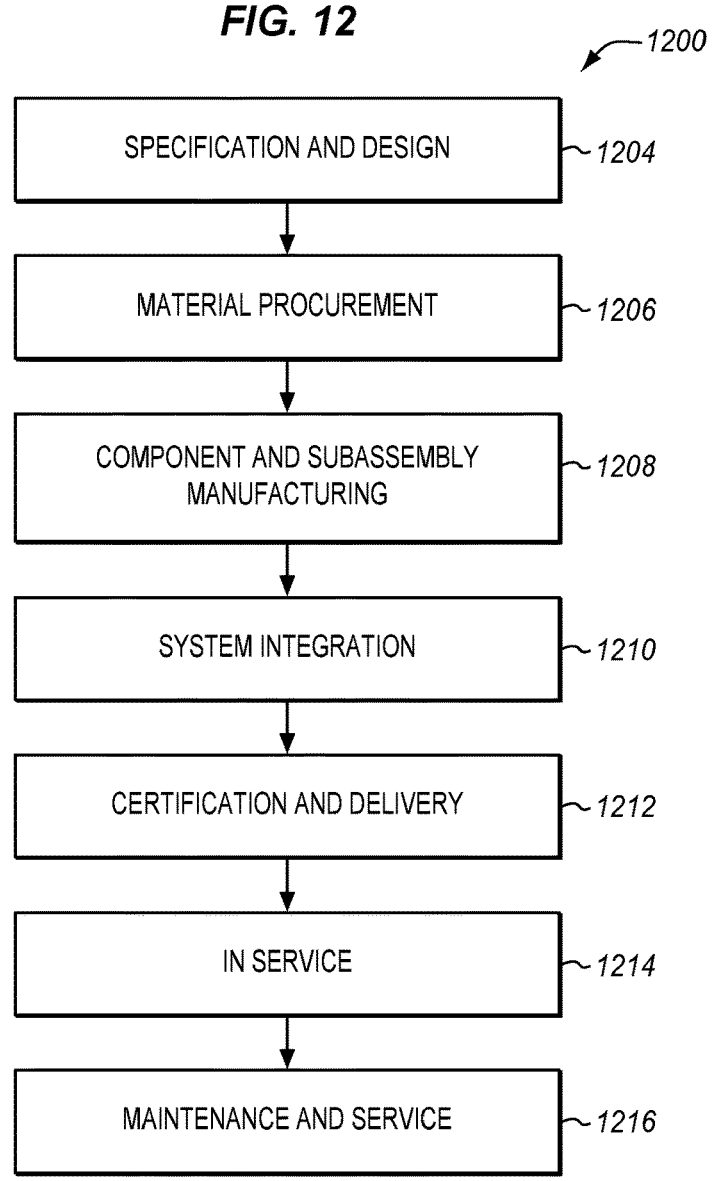
FIG. 12 is a flow diagram of aircraft production and service methodology in an illustrative embodiment.
Figure 13:
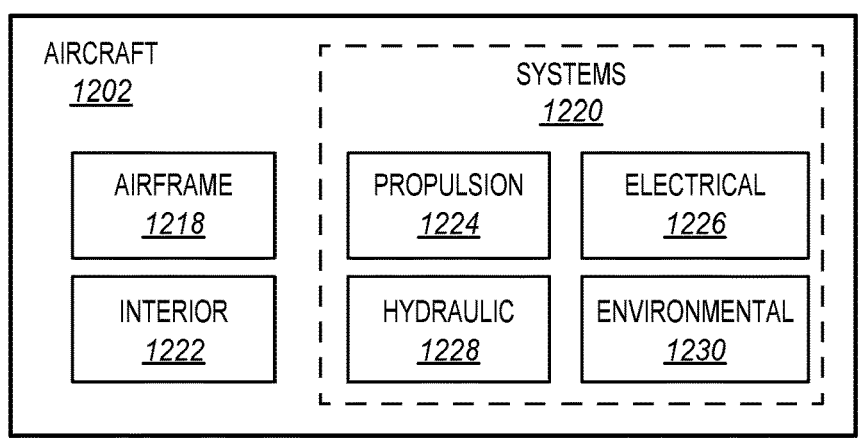
FIG. 13 is a block diagram of an aircraft in an illustrative embodiment.

Referring more particularly to the drawings, embodiments of the disclosure may be described in the context of aircraft manufacturing and service in method 1200 as shown in FIG. 12 and an aircraft 1202 as shown in FIG. 13. During pre-production, method 1200 may include specification and design 1204 of the aircraft 1202 and material procurement 1206. During production, component and subassembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine work in maintenance and service 1216 (which may also include modification, reconfiguration, refurbishment, and so on). Apparatus and methods embodied herein may be employed during any one or more suitable stages of the production and service described in method 1200 (e.g., specification and design 1204, material procurement 1206, component and subassembly manufacturing 1208, system integration 1210, certification and delivery 1212, service 1214, maintenance and service 1216) and/or any suitable component of aircraft 1202 (e.g., airframe 1218, systems 1220, interior 1222, propulsion system 1224, electrical system 1226, hydraulic system 1228, environmental 1230).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 1202 produced by method 1200 may include an airframe 1218 with a plurality of systems 1220 and an interior 1222. Examples of systems 1220 include one or more of a propulsion system 1224, an electrical system 1226, a hydraulic system 1228, and an environmental system 1230. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1200. For example, components or subassemblies corresponding to component and subassembly manufacturing 1208 may be fabricated or manufactured in a manner similar to components or subassemblies produced while the aircraft 1202 is in service. Also, one or more apparatus embodiments, method embodiments, or a combination thereof may be utilized during the subassembly manufacturing 1208 and system integration 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation during the maintenance and service 1216. For example, the techniques and systems described herein may be used for material procurement 1206, component and subassembly manufacturing 1208, system integration 1210, service 1214, and/or maintenance and service 1216, and/or may be used for airframe 1218 and/or interior 1222. These techniques and systems may even be utilized for systems 1220, including, for example, propulsion system 1224, electrical system 1226, hydraulic 1228, and/or environmental system 1230.

In one embodiment, a part comprises a portion of airframe 1218, and is manufactured during component and subassembly manufacturing 1208. The part may then be assembled into an aircraft in system integration 1210, and then be utilized in service 1214 until wear renders the part unusable. Then, in maintenance and service 1216, the part may be discarded and replaced with a newly manufactured part. Inventive components and methods may be utilized throughout component and subassembly manufacturing 1208 in order to facilitate inspection and maintenance for systems that manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for reporting proximity in an assembly environment, the method comprising:
    equipping a technician with a first proximity detector that is wearable;
    disposing a second proximity detector at a robot that moves within a cell of the assembly environment;
    transmitting signals from the proximity detectors to sensors in the assembly environment that are disposed outside of the cell; and
    directing the first proximity detector to provide a warning to the technician if a distance between the first proximity detector and the second proximity detector, determined based on the signals from the proximity detectors, is less than a threshold while the technician is within the cell.

2. The method of claim 1 wherein:
    transmitting comprises:
        transmitting a first signal from the first proximity detector to sensors in the assembly environment; and
        transmitting a second signal from the second proximity detector to the sensors.

3. The method of claim 2 further comprising:
    determining a distance between the first proximity detector and the second proximity detector based on the first signal and the second signal.

4. The method of claim 2 wherein:
    the threshold is a first threshold, and the method further comprises:
    directing the robot to halt if the distance is less than a second threshold that is smaller than the first threshold.

5. The method of claim 1 further comprising:
    placing multiple proximity detectors at the robot, each of the multiple proximity detectors transmitting a signal that identifies the robot and distinguishes the proximity detector from other proximity detectors at the robot; and determining distances between each of the multiple proximity detectors at the robot and the first proximity detector.

6. The method of claim 5 further comprising:

directing the first proximity detector to provide a warning to the technician if any of the distances are less than the threshold.

7. The method of claim 6 further comprising:

directing the robot to halt movement if any of the distances are less than a second threshold.

8. A portion of an aircraft assembled according to the method of claim 1.

9. A non-transitory computer readable medium embodying programmed instructions which, when executed by a processor, are operable for performing a method for reporting proximity in an assembly environment, the method comprising:

equipping a technician with a first proximity detector that is wearable;

disposing a second proximity detector at a robot that moves within a cell of the assembly environment;

transmitting signals from the proximity detectors to sensors in the assembly environment that are disposed outside of the cell; and directing the first proximity detector to provide a warning to the technician if a distance between the first proximity detector and the second proximity detector, determined based on the signals from the proximity detectors, is less than a threshold while the technician is within the cell.

10. The medium of claim 9 wherein:

transmitting comprises:

transmitting a first signal from the first proximity detector to sensors in the assembly environment; and transmitting a second signal from the second proximity detector to the sensors.

11. The medium of claim 10 wherein the method further comprises:

determining a distance between the first proximity detector and the second proximity detector based on the first signal and the second signal.

12. The medium of claim 10 wherein:

the threshold is a first threshold, and the method further comprises:

directing the robot to halt if the distance is less than a second threshold that is smaller than the first threshold.

13. The medium of claim 9 wherein the method further comprises:

placing multiple proximity detectors at the robot, each of the multiple proximity detectors transmitting a signal that identifies the robot and distinguishes the proximity detector from other proximity detectors at the robot; and determining distances between each of the multiple proximity detectors at the robot and the first proximity detector.

14. The medium of claim 13 wherein the method further comprises:

directing the first proximity detector to provide a warning to the technician if any of the distances are less than the threshold.

15. The medium of claim 14 wherein the method further comprises:

directing the robot to halt movement if any of the distances are less than a second threshold.

16. A portion of an aircraft assembled according to the method defined by the instructions stored on the computer readable medium of claim 9.

17. A system for proximity reporting in an assembly environment, the system comprising:

a first proximity detector that is wearable;

a second proximity detector that is disposed at a robot in a cell of the assembly environment;

sensors in the assembly environment that are disposed outside of the cell and a proximity server comprising:

a memory storing data indicating a first threshold and a second threshold that is smaller than the first threshold; and a controller that analyzes a first signal and a second signal received by the sensors to determine a distance between the first proximity detector and the second proximity detector based on the first signal and the second signal, provides a notification to the first proximity detector if the distance is less than the first threshold, and provides a notification to the second proximity detector if the distance is less than the second threshold while the first proximity detector is within the cell.

18. The system of claim 17 wherein:

the first proximity detector comprises:

a transceiver; and a controller that directs the transceiver to transmit a first signal to sensors in the assembly environment, and that warns a technician wearing the proximity detector, based on a notification received from a proximity reporting server.

19. The system of claim 17 wherein:

the first proximity detector is implemented within a hat, helmet, glasses, vest, or glove.

20. The system of claim 18 wherein:

the second proximity detector comprises:

a transceiver; and a controller that directs the transceiver to transmit a second signal to the sensors in the assembly environment, and that directs the robot to halt, based on a notification received from the proximity reporting server.

21. Fabricating a portion of an aircraft using the system of claim 17.

22. A system for detecting a proximity between technicians and robots, the system comprising:

sensors that receive signals indicating positions of a first proximity detector worn by a technician and a second proximity detector at a robot, and that are disposed outside of a cell occupied by the robot and the technician; and a proximity server comprising:

a memory that stores the signals; and a controller that determines a distance between the first proximity detector and the second proximity detector, directs the first proximity detector to provide a warning to the technician if the distance is less than a first threshold, and directs the robot to halt if the distance is less than a second threshold while the technician is within the cell.

23. Fabricating a portion of an aircraft using the system of claim 22.

* * * * *